United States Patent
Kitagawa et al.

(10) Patent No.: US 9,876,245 B2
(45) Date of Patent: Jan. 23, 2018

(54) GAS SEPARATOR AND BATTERY SYSTEM HAVING THE SAME

(71) Applicant: DENSO CORPORATION, Kariya, Aichi-pref. (JP)

(72) Inventors: Kan Kitagawa, Nagoya (JP); Nobuyoshi Sakakibara, Nishio (JP); Kenichirou Kami, Takahama (JP); Hidehiko Hiramatsu, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 344 days.

(21) Appl. No.: 14/639,546

(22) Filed: Mar. 5, 2015

(65) Prior Publication Data

US 2015/0255817 A1 Sep. 10, 2015

(30) Foreign Application Priority Data

Mar. 7, 2014 (JP) ................. 2014-045124

(51) Int. Cl.
| | |
|---|---|
| H01M 12/06 | (2006.01) |
| H01M 12/04 | (2006.01) |
| H01M 8/0668 | (2016.01) |
| H01M 8/04 | (2016.01) |
| H01M 8/04089 | (2016.01) |
| H01M 8/04082 | (2016.01) |
| B01D 53/14 | (2006.01) |

(52) U.S. Cl.
CPC ...... *H01M 8/0668* (2013.01); *B01D 53/1475* (2013.01); *B01D 2252/202* (2013.01); *B01D 2252/205* (2013.01); *B01D 2252/20484* (2013.01); *B01D 2257/504* (2013.01); *B01D 2258/0208* (2013.01); *B01D 2258/06* (2013.01); *H01M 2250/20* (2013.01); *Y02C 10/06* (2013.01); *Y02T 90/32* (2013.01)

(58) Field of Classification Search
None
See application file for complete search history.

(56) References Cited

U.S. PATENT DOCUMENTS 3,785,870 A * 1/1974 Winsel .............. B01D 53/62
429/411
2002/0194990 A1 12/2002 Wegeng et al.
2003/0015093 A1 1/2003 Wegeng et al.

FOREIGN PATENT DOCUMENTS

| JP | 2003220316 A | 8/2003 |
|---|---|---|
| JP | 2009-199770 | 9/2009 |
| JP | 5016179 | 6/2012 |

* cited by examiner

*Primary Examiner* — Yoshitoshi Takeuchi
(74) *Attorney, Agent, or Firm* — Harness, Dickey & Pierce, P.L.C.

(57) ABSTRACT

A gas separator has an adsorbent, a circulation-passage constituting member, a circulator, an adsorption facilitator, and a desorption facilitator. The adsorbent adsorbs or desorbs carbon dioxide, and the adsorbent is made of a liquid. The circulation-passage constituting member therein has a space that defines a circulation passage in which the adsorbent flows. The circulator circulates the adsorbent in the space. The adsorption facilitator facilitates an adsorption of carbon dioxide to the adsorbent filling the space. The desorption facilitator facilitates a desorption of carbon dioxide from the adsorbent filling the space.

2 Claims, 2 Drawing Sheets

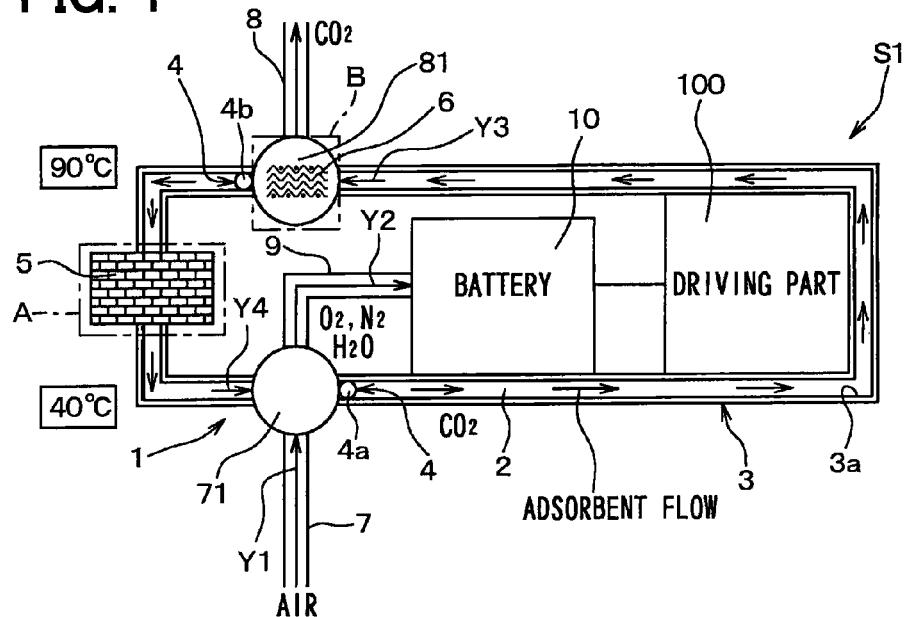
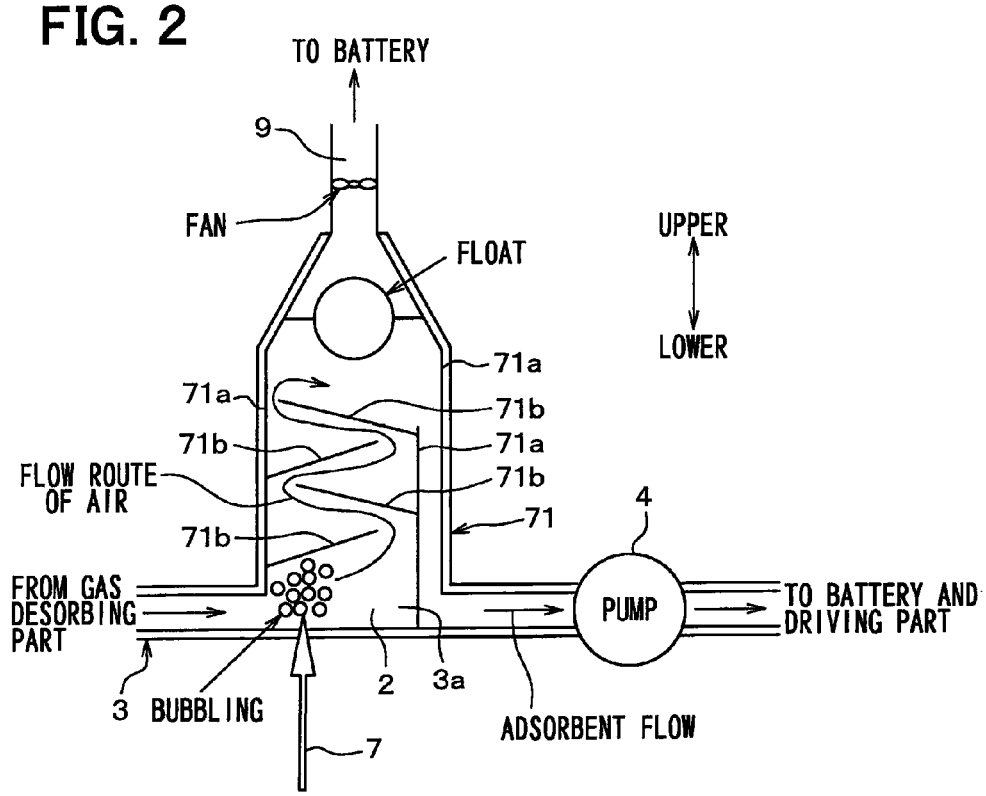

GAS SEPARATOR AND BATTERY SYSTEM HAVING THE SAME

CROSS REFERENCE TO RELATED APPLICATION

This application is based on Japanese Patent Application No. 2014-045124 filed on Mar. 7, 2014, the disclosure of which is incorporated herein by reference in its entirety.

TECHNICAL FIELD

The present disclosure relates to a gas separator using an adsorbent that adsorbs or desorbs carbon dioxide ($CO_2$) and a battery system having the gas separator to remove $CO_2$ from gas that is used by a battery generating electric power.

BACKGROUND

Conventionally, a gas separator is known to use an adsorbent adsorbing or desorbing $CO_2$. For example, Patent Document 1 (Japanese Patent No. 5016179) describes this kind of gas separator. $CO_2$ is an impurity gas that is included in gas used by a battery generating electric power in a battery system, and the gas separator removes the $CO_2$ from the gas. In Patent Document 1, the battery is constituted by a fuel cell. Generally, a fuel cell has an electrode for fuel, an electrode for oxygen, and an electrolyte. Gas including hydrogen ($H_2$) and Oxygen ($O_2$) are introduced to the electrodes. Specifically, $H_2$ is introduced to the electrode for fuel, and $O_2$ is introduced to the electrode for oxygen. When the gas introduced to the electrodes includes $CO_2$, the $CO_2$ comes into the fuel cell and reacts with the electrolyte to form a carbonate. In the result, an electromotive force may decrease due to a decrease of pH, and a surface of the electrodes may be coated by a precipitation of the carbonate. In Patent Document 1, the gas separator removes the $CO_2$ included in the gas (i.e., $H_2$) that is used by the battery generating electric power before the $CO_2$ comes into the battery.

The gas separator has adsorbents that is made of a solid adsorbing agent such as 13× zeolite pellets, and arranged annularly. The gas separator further has a cooler cooling the adsorbents and a heater heating the adsorbents. The cooler and the heater are arranged to be distanced from each other. In the gas separator, an adsorption of $CO_2$ to the adsorbents is facilitated when the adsorbents are cooled by the cooler, and a desorption of $CO_2$ from the adsorbents is facilitated when the adsorbents are heated by the heater. By desorbing $CO_2$ from the adsorbents, the adsorbents return to a condition to adsorb $CO_2$ easily. In the following description, an area in which the adsorption of $CO_2$ to the adsorbents is facilitated by the cooler will be referred to as an adsorption facilitating area, and an area in which the desorption of $CO_2$ from the adsorbents is facilitated by the heater will be referred to as a desorption facilitating area.

In the gas separator, the adsorbents arranged annularly are rotate clockwise such that the adsorbents in the adsorption facilitating area and the adsorbents in the desorption facilitating area are switched in turn. Accordingly, in the gas separator, the adsorbents come into the adsorption facilitating area one after another, and $CO_2$ can be adsorbed continuously without waiting the adsorbents of which $CO_2$ adsorption capacity is full to return to the condition to adsorb $CO_2$ easily. On the other hand, when a single adsorbent is used, and when the adsorbent is not ready to adsorb $CO_2$, the battery cannot generate electric power. In contrast, according to the gas separator of Patent Document 1, the battery can generate electric power continuously as the $CO_2$ is adsorbed. As described above, the gas separator of Patent Document 1 removes $CO_2$ from the gas that is used by the battery generating electric power in the battery system.

However, according to studies conducted by the inventors of the present disclosure, in the gas separator of the Patent Document 1, a component such as a pipe is required for each of the adsorbents made of a solid adsorbing agent. Moreover, a device to rotate components such as the adsorbents and pipes is required. Thus, there is a possibility that a complicated mechanism may be needed, or the gas separator may be upsized as a whole.

SUMMARY

The present disclosure addresses the above matters. Thus, it is an object of the present disclosure to provide a gas separator that uses an adsorbent adsorbing or desorbing carbon dioxide ($CO_2$), and with which the adsorbing or desorbing can be performed continuously with a simple mechanism.

A gas separator of the present disclosure has an adsorbent, a circulation-passage constituting member, a circulator, an adsorption facilitator, and a desorption facilitator. The adsorbent adsorbs or desorbs carbon dioxide, and the adsorbent is made of a liquid. The circulation-passage constituting member therein has a space that defines a circulation passage in which the adsorbent flows. The circulator circulates the adsorbent in the space. The adsorption facilitator facilitates an adsorption of carbon dioxide to the adsorbent filling the space. The desorption facilitator facilitates a desorption of carbon dioxide from the adsorbent filling the space.

By circulating the adsorbent in the space of the circulation-passage constituting member, a series of performances described hereafter is operated. The adsorbent cooled by the adsorption facilitator and promoted to adsorb $CO_2$ adsorbs $CO_2$ in an adsorption facilitating area. The adsorbent heated by the desorption facilitator and promoted to desorb $CO_2$ after adsorbing $CO_2$ flows into a desorption facilitating area. By desorbing $CO_2$, the adsorbent can return to a condition to adsorb $CO_2$. The adsorbent after desorbing $CO_2$ flows into the adsorption facilitating area. By operating the series of performances in cycle, $CO_2$ can be adsorbed continuously without waiting the adsorbent of which $CO_2$ adsorption capacity is full to return to the condition to adsorb $CO_2$ as simplifying a structure of the gas separator.

BRIEF DESCRIPTION OF THE DRAWINGS

The above and other objects, features and advantages of the present disclosure will become more apparent from the following detailed description made with reference to the accompanying drawings. In the drawings:

FIG. 1 is a schematic diagram illustrating a battery system of a first embodiment;

FIG. 2 is an enlarged diagram illustrating around an air introducing passage of circulation pipes that are included in a gas separator in the battery system shown in FIG. 1.

DETAILED DESCRIPTION

Figure 3:
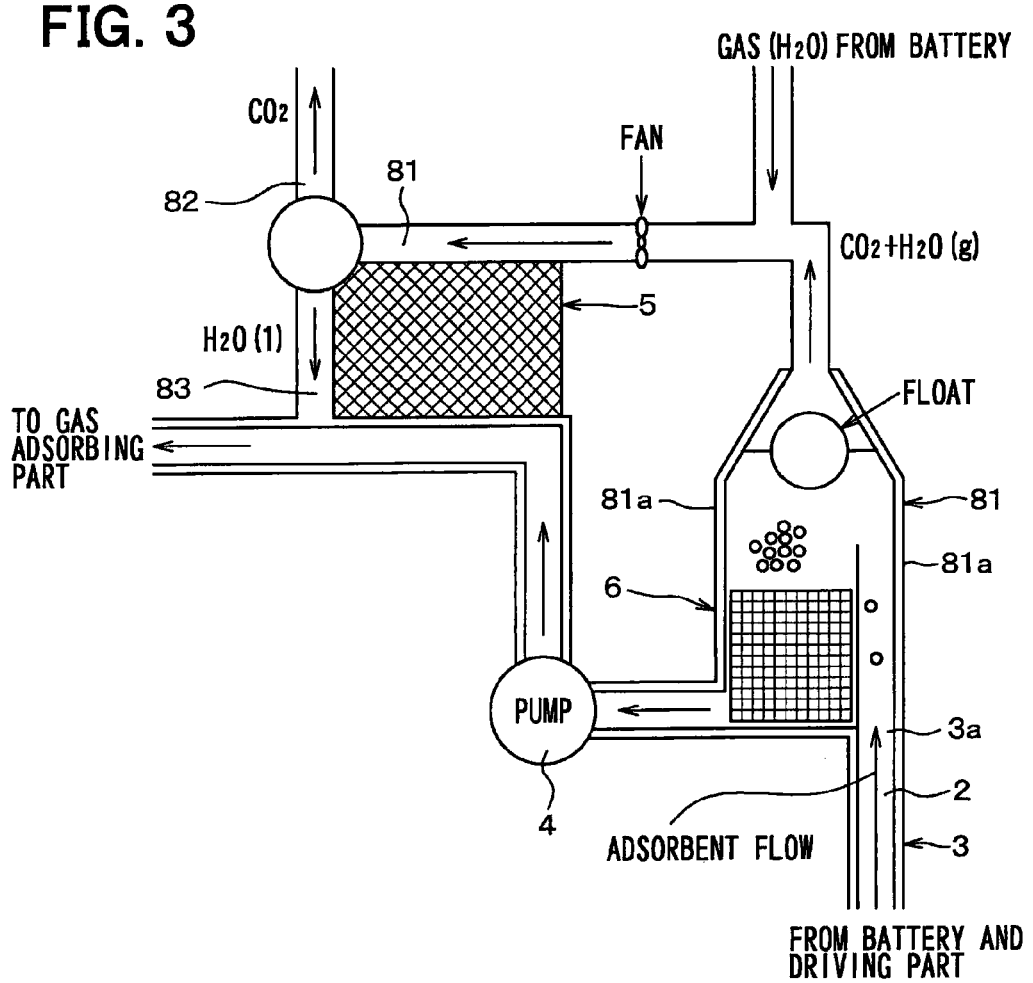
FIG. 3 is an enlarged diagram illustrating around an air emitting passage of the circulation pipes that are included in the gas separator in the battery system shown in FIG. 1.

An embodiment of the present disclosure will be described hereafter referring to drawings.

(Embodiment)

A gas separator 1 of an embodiment will be described referring to FIGS. 1 to 3. In the present embodiment, the gas separator 1 is used in a battery system S1 shown in FIG. 1. As shown in FIG. 1, the battery system S1 has the gas separator 1, a battery 10, and a driving part 100 driven by electric power that is generated by the battery 10. The battery system S1 is used, for example, as a system that is mounted in a vehicle such as a car and supplies electric power to drive various devices such as the driving part 100 for the vehicle. The driving part 100 is, for example, a motor. In the present embodiment, the battery 10 is a conventional alkali fuel cell having an electrode for fuel, an electrode for oxygen, and an electrolyte. However, a constitution of the battery 10 is not limited, and the battery 10 may be an air cell or the like.

As shown in FIG. 1, the gas separator 1 has an adsorbent 2, a cooler 5 cooling the adsorbent 2, a heater 6 heating the adsorbent 2, a circulation pipe 3 providing a circuit (i.e., a circulation passage) in which the adsorbent 2 circulates, and a pump 4 causing the adsorbent 2 to circulate in the circulation pipe 3. In the battery system S1, the battery 10 uses air (i.e., gas) including oxygen ($O_2$) to generate electric power, and the gas separator 1 removes carbon dioxide ($CO_2$) from the air used by the battery 10.

The gas separator 1 further has an air introducing passage 7, a gas emitting passage 8, and a gas introducing passage 9, as shown in FIG. 1. The circulation pipe 3 therein has a space 3a, and the air introducing passage 7 introduces air including $O_2$ into the space 3a such that the battery 10 uses the air to generate electric power. $CO_2$ included in air is emitted outside from the space 3a through the gas emitting passage 8. The air introduced into the space 3a includes gas such as $O_2$ and $H_2O$ (i.e., water), and the battery 10 uses the gas. The gas introducing passage 9 introduces the gas to the battery.

A gas adsorbing part 71 is located at a portion in the circulation pipe 3 where the circulation pipe 3 and the air introducing passage 7 are connected to each other. A gas desorbing part 81 is located at a portion in the circulation pipe 3 where the circulation pipe 3 and the gas emitting passage 8 are connected to each other. The adsorbent 2 cooled by the cooler 5 adsorbs $CO_2$ in the gas adsorbing part 71, and the adsorbent 2 heated by the heater 6 desorbs $CO_2$ in the gas desorbing part 81.

The adsorbent 2 is liquid that is promoted to adsorb or desorb a gas by a temperature variation, a pressure variation, or the like. Specifically, in a case that the adsorbent 2 is promoted to adsorb or desorb a gas by a temperature variation, an adsorption is facilitated when a temperature of the adsorbent 2 is lower than a normal temperature in a usage environment of the gas separator 1, and a desorption is facilitated when the temperature of the adsorbent 2 is higher than the normal temperature. In a case that the adsorbent 2 is promoted to adsorb or desorb a gas by a pressure variation, the adsorption is facilitated when a pressure of the adsorbent 2 is lower than a normal pressure in the usage environment of the gas separator 1, and the desorption is facilitated when the pressure of the adsorbent 2 is higher than the normal pressure. As an example, the adsorbent 2 of the present embodiment is made of monoethanolamine aqueous solution that is liquid adsorbing or desorbing $CO_2$ and in which monoethanolamine and water are mixed. A $CO_2$ adsorption amount of monoethanolamine varies drastically by the temperature variation. Since monoethanolamine is weak base, monoethanolamine desorbs $CO_2$ when being heated after being cooled and after adsorbing a weak acid gas such as $CO_2$.

As shown in FIG. 1, the adsorbent 2 fills the space 3a in the circulation pipe 3. Since the circulation pipe 3 provides the circulation passage, the adsorbent 2 circulates by flowing in the space 3a defined in the circulation pipe 3.

The circulation pipe 3 is a circulation-passage constituting member that provides the space 3a defining the circulation passage in which the adsorbent 2 flows. As shown in FIG. 1, the space 3a of the circulation pipe 3 is filled with the adsorbent 2 and used to transfer the adsorbent 2. The circulation-passage constituting member is not limited to the circulation pipe 3 as long as having a circulation passage with which the adsorbent 2 is caused to circulate. In the gas separator 1 of the present embodiment, since the circulation pipe 3 having the space 3a providing the circulation passage (i.e., the circuit), the adsorbent 2 is caused to circulate in the circulation passage.

The pump 4 is a circulator causing the adsorbent 2 to circulate in the space 3a of the circulation pipe 3. In the present embodiment, more than two of the pumps 4 are disposed, and the pumps 4 apply a pressure to the adsorbent 2 such that the adsorbent 2 circulates in the space 3a of the circulation pipe 3 providing the circulation passage. As shown in FIG. 1, the adsorbent 2 flows and circulates counterclockwise in a diagram of FIG. 1.

As shown in FIG. 2, one of the pumps 4 is a pump 4a that is located on a downstream side of the gas adsorbing part 71 in the circulation pipe 3 in a flow direction of the adsorbent 2. Since the pump 4a draws the adsorbent 2 stored in the gas adsorbing part 71, the adsorbent 2 hardly flows into the gas introducing passage 9 from the gas adsorbing part 71. Another one of the pumps 4 is a pump 4b that is located on a downstream side of the gas desorbing part 81 in the circulation pipe 3 in the flow direction of the adsorbent 2. Since the pump 4b draws the adsorbent 2 stored in the gas desorbing part 81, the adsorbent 2 hardly flows into the gas emitting passage 8 from the gas desorbing part 81.

The cooler 5 cooling the adsorbent 2 is an adsorption facilitator that facilitates adsorption of the gas (i.e., $CO_2$) to the adsorbent 2 filling the space 3a of the circulation pipe 3. The cooler 5 is equivalent to a cooling device and constituted by, for example, a radiator.

As shown in FIG. 1, the cooler 5 is located in a portion of the circulation pipe 3, through which the adsorbent 2 passes as flowing from the gas desorbing part 81 to the gas adsorbing part 71. Accordingly, the adsorbent 2 cooled by the cooler 5 and promoted to adsorb the gas (i.e., $CO_2$) flows into the gas adsorbing part 71.

The heater 6 heating the adsorbent 2 is a desorption facilitator that facilitates desorption of the gas (i.e., $CO_2$) from the adsorbent 2 filling the space 3a of the circulation pipe 3. The heater 6 is equivalent to a heating device such as a mesh heater operated with high heating efficiency.

As shown in FIG. 1, the heater 6 is located in a portion of the circulation pipe 3, through which the adsorbent 2 passes as flowing from the gas adsorbing part 71 to the cooler 5. Specifically, the heater 6 is located in the circulation pipe 3 between the driving part 100 and the cooler 5. In the present embodiment, the heater 6 is located in the gas desorbing part 81. Accordingly, the adsorbent 2 heated by the heater 6 and promoted to desorb the gas (i.e., $CO_2$) flows into the gas desorbing part 81.

An area in which an adsorption of the gas (i.e., $CO_2$) to the adsorbent 2 is facilitated by the cooler 5 will be hereafter referred to as an adsorption facilitating area. The adsorption facilitating area is shown by a chain line and assigned with an alphabet A in FIG. 1. An area in which a desorption of the gas (i.e., $CO_2$) from the adsorbent 2 is facilitated by the heater 6 will be hereafter referred to as a desorption facilitating area. The desorption facilitating area is shown by a chain line and assigned with an alphabet B in FIG. 1. The adsorption facilitating area and the desorption facilitating area are distanced from each other.

As shown in FIG. 2, the air introducing passage 7 and the gas introducing passage 9 are connected to the gas adsorbing part 71. The gas introducing passage 9 introduces remaining components such as $N_2$ and $O_2$ to the battery 10. The remaining components are rest of components in air after removing $CO_2$ from the air by the adsorption of the adsorbent 2. Moreover, $H_2O$ included in the adsorbent 2 that is an aqueous solution flows to the battery 10 through the gas introducing passage 9. Accordingly, in a case that the battery 10 generates electric power using $H_2O$, the battery 10 generating electric power can effectively use $H_2O$ included in the adsorbent 2. Therefore, $H_2O$ included in the adsorbent 2 may be introduced to the battery 10 in a case that the battery 10 is an aqueous air battery, not only in a case that the battery 10 is an alkali fuel cell as in the present embodiment.

As shown in FIG. 2, the gas adsorbing part 71 has an inner wall surface 71a defining a passage extends from the air introducing passage 7 to the gas introducing passage 9. The inner wall surface 71a extends in a vertical direction, in other words, an upper-lower direction in FIG. 2. The gas introducing passage 9 is connected with an upper portion of the gas adsorbing part 71, and the air introducing passage 7 is connected with a lower portion of the air introducing passage 7. Air is introduced from the air introducing passage 7 to the space 3a by bubbling (i.e., blowing air into liquid). Since air is lighter than the adsorbent 2 in weight, the air becomes bubbles, and the bubbles of the air move upward and flow into the gas introducing passage 9. Since air is caused to flow in the space 3a by bubbling, a contact area where air and the adsorbent 2 are in contact with each other increases as compared to a case that the adsorbent 2 is a solid adsorbent adsorbing gas. Accordingly, the adsorbent 2 of the present embodiment can adsorb $CO_2$ effectively.

As shown in FIG. 2, the inner wall surface 71a has baffle boards 71b interrupting a flow of the adsorbent 2. The baffle boards 71b are arranged alternately in zigzag such that the adsorbent 2 including air meanders in the gas adsorbing part 71. Accordingly, since a passage in which air flows becomes longer, a contact duration of air and the adsorbent 2 being in contact with each other increases, and air of which $CO_2$ is adsorbed insufficiently is prevented from being introduced into the gas introducing passage 9. For example, the baffle boards 71b may be flat plates extending in a direction generally perpendicular to an extending direction of a line passing through the air introducing passage 7 and the gas introducing passage 9, in other words, generally perpendicular to a traveling direction of air. The baffle boards 71b are intermittently arranged one after another in the extending direction of the line passing through the air introducing passage 7 and the gas introducing passage 9.

As shown in FIG. 3, the gas desorbing part 81 has an inner wall surface 81a extending in the vertical direction. The gas emitting passage 8 is connected with an upper portion of the gas desorbing part 81 in the vertical direction, and the adsorbent 2 is introduced from a lower portion of the gas desorbing part 81 into the gas desorbing part 81. The adsorbent 2 desorbs $CO_2$ when the heater 6 heats the adsorbent 2 introduced into the gas desorbing part 81 from the lower portion of the gas desorbing part 81. $CO_2$ desorbed from the adsorbent 2 becomes bubbles, and the bubbles of $CO_2$ moves upward and is introduced into the gas emitting passage 8. $H_2O$ included in the adsorbent 2 is also introduced into the gas emitting passage 8 by being heated by the heater 6.

As shown in FIG. 3, the gas emitting passage 8 extends to the cooler 5, and is divided into a first passage 82 communicating with outside and a second passage 83 communicating with the space 3a on a downstream side of the cooler 5 in a flow direction of the adsorbent 2. $CO_2$ introduced from the gas desorbing part 81 is emitted outside through the first passage 82, and $H_2O$ is introduced to the cooler 5, liquefied by the cooler 5, and returned to the space 3a through the second passage 83. Thus, $H_2O$ included in the adsorbent 2 flows from the gas desorbing part 81 to the gas emitting passage 8 and returns to the space 3a after being liquefied by being cooled by the cooler 5. Therefore, according to the battery system S1 of the present embodiment, since $H_2O$ included in the adsorbent 2 returns to the space 3a without being emitted outside, $H_2O$ can be effectively used by the battery 10 generating electric power with less waste. Furthermore, as shown in FIG. 3, $H_2O$ that is a gas emitted from the battery 10 is introduced to the gas emitting passage 8 to be emitted outside through the first passage 82.

As shown in FIG. 1, the battery 10 abuts a portion of the circulation pipe 3, through which the adsorbent 2 passes as flowing from the gas adsorbing part 71 to the gas desorbing part 81. The driving part 100 is electrically connected with the battery 10 by a wiring (not shown). The driving part 100 abuts a portion of the circulation pipe 3, through which the adsorbent 2 passes as flowing from the gas adsorbing part 71 to the gas desorbing part 81. In other words, each of the battery 10 and the driving part 100 abuts the circulation pipe 3 at a portion through which the adsorbent 2 flows before heating by the heater 6 and after being cooled by the cooler. In the battery system S1 of the present embodiment, by arranging the battery 10 and the driving part 100 to abut the circulation pipe 3, the adsorbent 2 works as refrigerant for the battery 10 and the driving part 100.

An electric-power generation process in the battery system S1 of the present embodiment will be described hereafter together with a removing process of the gas (i.e., $CO_2$) by the gas separator 1

As shown by an arrow Y1 in FIG. 1, air including $O_2$ that is used by the battery 10 generating electric power is introduced from the air introducing passage 7 into the gas adsorbing part 71 of the circulation pipe 3. The adsorbent 2 filling the gas adsorbing part 71 is cooled by the cooler 5, for example, to be 40° C., and put in a condition that the adsorption of $CO_2$ to the adsorbent 2 is promoted. Accordingly, $CO_2$ included in air is adsorbed by the adsorbent 2.

The remaining components and $H_2O$ included in the adsorbent 2 that is aqueous solution are introduced to the gas introducing passage 9. The remaining components and $H_2O$ included in the adsorbent 2 are introduced to the battery 10 through the gas introducing passage 9 to be used by the battery 10 generating electric power. The battery 10 generates electric power using the remaining components and $H_2O$ included in the adsorbent 2 that are introduced to the battery 10 through the gas introducing passage 9.

Equations of reactions regarding an electric power generation of the battery 10 are shown below.

Anodic reaction at the electrode for oxygen:
$$O_2 + 2H_2O + 4e^- \rightarrow 4OH^-$$

Catholic reaction at the electrode for fuel:
$$2H_2 + 4OH^- \rightarrow 4H_2O + 4e^-$$

Overall reaction: $O_2 + 2H_2 \rightarrow 2H_2O$

Electric power generated by the battery 10 is applied to the driving part 100 through the wiring (not shown), and used as a power for driving the driving part 100.

The air introduced into the gas adsorbing part 71 includes $CO_2$, and the $CO_2$ is adsorbed to the adsorbent 2 and introduced to the desorption facilitating area through the space 3a together with the adsorbent 2 as shown by an arrow Y3 in FIG. 1. The adsorbent 2 passes a portion of the circulation pipe 3 that is in contact with the battery 10 and a portion of the circulation pipe 3 that is in contact with the driving part 100 as flowing from the gas adsorbing part 71 to the gas desorbing part 81. Since the adsorbent 2 is cooled by the cooler 5 to have a low temperature, heat of the battery 10 and the driving part 100 transfers to the adsorbent 2, and thereby the battery 10 and the driving part 100 are cooled. Thus, the battery 10 and the driving part 100 are cooled, and the adsorbent 2 heated by the battery 10 and the driving part 100 is introduced to the gas desorbing part 81.

The adsorbent 2 including $CO_2$ and flowing into the desorption facilitating area desorbs $CO_2$ by being heated by the heater 6, for example, to be 90° C. The adsorbent 2 is introduced to the adsorption facilitating area through the space 3a after desorbing $CO_2$, as shown by an arrow Y4 in FIG. 1. Thus, a series of performances in which the adsorbent 2 circulates as shown by the arrows Y1 to Y4 is operated in cycle.

In the gas separator 1, the adsorbent 2 circulates in the space 3a of the circulation pipe 3. The adsorbent 2 cooled by the cooler 5 and promoted to adsorb $CO_2$ adsorbs $CO_2$ in the adsorption facilitating area. The adsorbent 2 heated by the heater 6 and promoted to desorb $CO_2$ after adsorbing $CO_2$ flows into the desorption facilitating area and desorbs $CO_2$. By desorbing $CO_2$, the adsorbent 2 returns to a condition to adsorb gas easily. The adsorbent 2 after desorbing $CO_2$ flows into the adsorption facilitating area. In the gas separator 1, the above series of performances is operated in cycle.

As described above, the gas separator 1 of the present embodiment has the adsorbent 2 adsorbing or desorbing $CO_2$, the circulation pipe 3 therein having the space 3a that defines the circulation passage in which the adsorbent 2 flows, and the pump 4 circulating the adsorbent 2 in the space 3a. The gas separator 1 further has the cooler 5 and the heater 6. The cooler 5 facilitates the adsorption of $CO_2$ to the adsorbent 2 filling the space 3a, and the heater 6 facilitates the desorption of $CO_2$ from the adsorbent 2.

By circulating the adsorbent 2 in the space 3a of the circulation pipe 3, a series of performances described hereafter is operated. The adsorbent 2 cooled by the cooler 5 and promoted to adsorb $CO_2$ adsorbs $CO_2$ in the adsorption facilitating area. The adsorbent 2 heated by the heater 6 and promoted to desorb $CO_2$ after adsorbing $CO_2$ flows into the desorption facilitating area. By desorbing $CO_2$, the adsorbent 2 can return to the condition to adsorb $CO_2$. The adsorbent 2 after desorbing $CO_2$ flows into the adsorption facilitating area. By operating the series of performances in cycle, $CO_2$ can be adsorbed continuously without waiting the adsorbent 2 of which $CO_2$ adsorption capacity is full to return to the condition to adsorb $CO_2$ as simplifying a structure of the gas separator 1. Accordingly, in the battery system S1 of the present embodiment, the battery 10 can generate electric power continuously as removing $CO_2$.

In the battery system S1 of the present embodiment, since the battery 10 abuts the portion of the circulation pipe 3, through which the adsorbent 2 passes as flowing from the gas adsorbing part 71 to the gas desorbing part 81, the adsorbent 2 works as refrigerant for the battery 10. Furthermore, since the driving part 100 abuts the portion of the circulation pipe 3, through which the adsorbent 2 passes as flowing from the gas adsorbing part 71 to the gas desorbing part 81, the adsorbent 2 works as refrigerant for the driving part 100.

Accordingly, the battery 10 and the driving part 100 are cooled, and the adsorbent 2 at relatively high temperature is introduced to the gas desorbing part 81. Therefore, the battery system S1 of the present embodiment is operated with high thermal efficiency.

In the gas separator 1, $H_2O$ included in the adsorbent 2 that is aqueous solution is supplied to the battery 10.

Therefore, when the battery 10 generates electric power using $H_2O$, the battery 10 generating electric power can effectively use $H_2O$ included in the adsorbent 2.

(Other Modifications)

It should be noted that the present disclosure is not limited to the above embodiment and can be modified as required.

In the battery system S1 of the above embodiment, the adsorbent 2 is monoethanolamin aqueous solution, the adsorption facilitator is the cooler 5, and the desorption facilitator is the heater 6. With such a constitution, the adsorbent 2 is promoted to adsorb or desorb gas by a temperature variation. However, the adsorbent 2 may be promoted to adsorb or desorb gas by a pressure variation. Specifically, in the gas separator 1 of the above embodiment, the adsorbent 2 may be another liquid such as acetone, ethanol, or benzene that are preferable for adsorption or desorption of $CO_2$ depending on a pressure variation. In such a case, the adsorption facilitator may be a decompressor decompressing the adsorbent 2, and the desorption facilitator may be a compressor such that $CO_2$ can be adsorbed or desorbed continuously similar to the above embodiment.

Such changes and modifications are to be understood as being within the scope of the present disclosure as defined by the appended claims.

What is claimed is:

1. A battery system comprising:
   (1) a battery using a gas to generate electric power;
   (2) a gas separator, the gas separator comprising:
       an adsorbent adsorbing or desorbing carbon dioxide, the adsorbent made of a liquid;
       a circulation-passage constituting member therein having a space that defines a circulation passage in which the adsorbent flows;
       a circulator circulating the adsorbent in the space;
       an adsorption facilitator facilitating an adsorption of carbon dioxide to the adsorbent filling the space; and
       a desorption facilitator facilitating a desorption of carbon dioxide from the adsorbent filling the space, wherein
       the adsorbent is a liquid that is promoted to adsorb or desorb carbon dioxide by a temperature variation,
       the adsorption facilitator is a cooler cooling the adsorbent,
       the desorption facilitator is a heater heating the adsorbent, and
       the gas separator removes carbon dioxide included in the gas by adsorbing or desorbing the carbon dioxide using the adsorbents; and
   (3) a driving part driven by the electric power generated by the battery,
       wherein the driving part abuts the circulation-passage constituting member, and the adsorbent works as refrigerant for the driving part by locating the driving part to abut the circulation-passage, constituting member.

2. The battery system according to claim 1, wherein
the adsorbent is an aqueous solution, and
the aqueous solution includes water, and the water flows to the battery.

* * * * *